T. C. Robinson,
Steam Engine,
No. 52,078. Patented Jan. 16, 1866.

Witnesses:
J. D. VanDuzer
R. H. Lindley

Inventor:
Thomas C. Robinson

UNITED STATES PATENT OFFICE.

THOMAS C. ROBINSON, OF BOSTON, MASSACHUSETTS.

IMPROVEMENT IN STEAM-ENGINES.

Specification forming part of Letters Patent No. 52,078, dated January 16, 1866.

*To all whom it may concern:*

Be it known that I, THOMAS C. ROBINSON, of Boston, in the county of Suffolk and Commonwealth of Massachusetts, have invented a new and useful Improvement in Steam-Engines; and I hereby declare that the following is a full, clear, and exact description of the said improvement, reference being had to the accompanying drawings, making a part of this specification, and the letters of reference marked thereon, in which the same letter represents the same thing in each figure.

Figure 5:
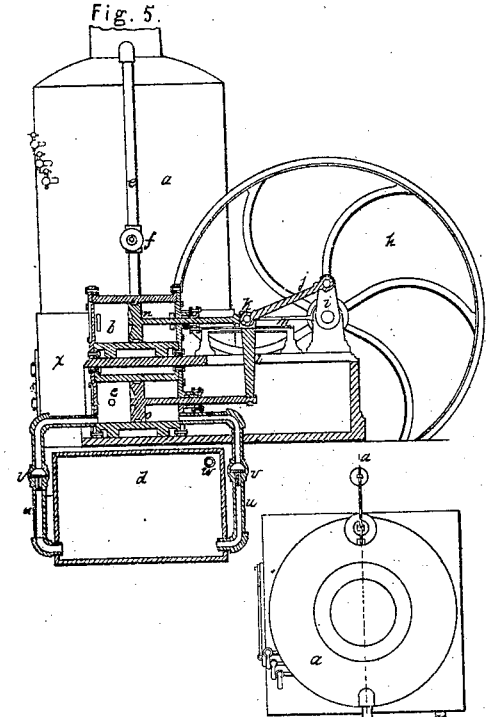
Figure 3:
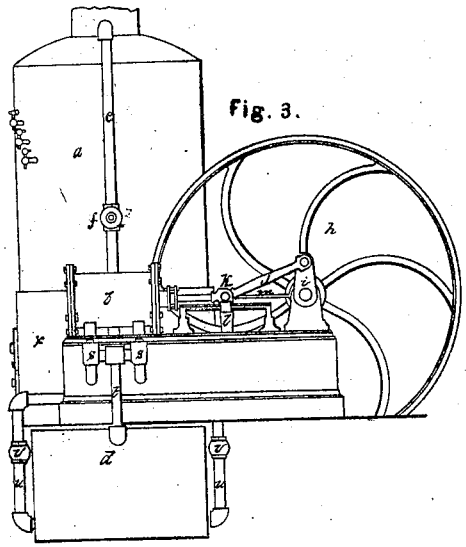
Figure 1:
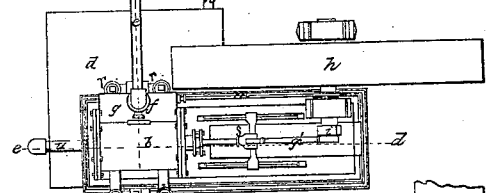
Figure 4:
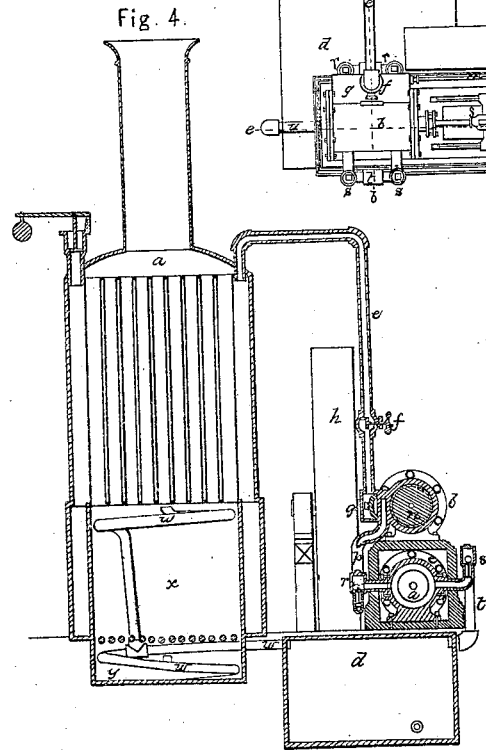
Figure 2:
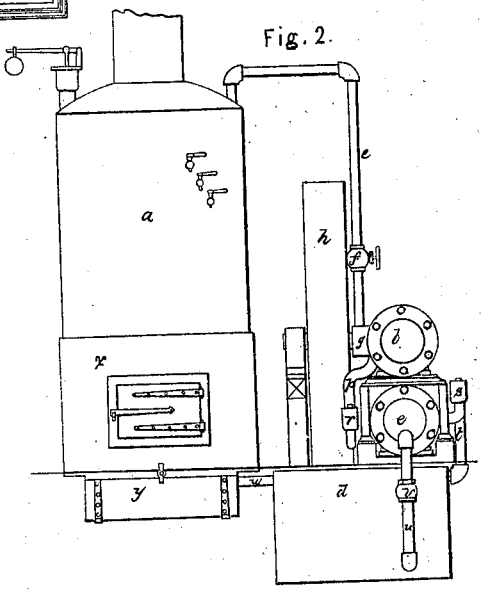

Figure 1 is a top view of the engine. Fig. 2 is a front elevation of the same. Fig. 3 is a side elevation. Fig. 4 is a sectional view of said engine in a plane drawn through the line $a$ and $b$ in Fig. 1. Fig. 5 is a longitudinal section through engine and tank in a plane drawn through the line $c$ and $d$ in Fig. 1.

$a\ a$ is the boiler; $b\ b$, the steam-cylinder; $c\ c$, condensing-cylinder; $d$, hot-water tank; $e$, steam-pipe; $f$, throttle-valve; $g\ g$, steam-chest; $h$, balance-wheel; $i$, crank; $j$, connecting-rod; $k$, cross-head; $l$, arm to condensing-piston; $m$, valve-rod; $n$, piston to steam-cylinder; $o$, piston to condenser; $p$, exhaust-pipe; $r$, inlet-valves to condenser; $s$, outlet-valves to condenser; $t$, exhaust-pipe to condenser; $u$, water-pipe between tank and condenser; $v$, check-valves to prevent the water from returning to the tank; $w$, pipes to discharge unencumbered steam; $x$, fire-box; $y$, ash-pit.

The difference between this and the ordinary engines is as follows: In the ordinary high-pressure engines the exhaust is through an open pipe into the air, save in the locomotive or hoisting engine, which throws the exhaust-steam into the smoke-pipe. In the common dummy-engine the exhaust-steam passes into a cold-water tank. In none of the engines now in use do we find the exhaust carried through a cylinder corresponding with the main cylinder in construction and capacity. Neither do we find in any engine now in use that the exhaust-steam is mixed with hot water in a cylinder and carried from that, after partial condensation, into a hot-water tank. In ordinary engines there is but one cylinder. There are two in this—the steam-cylinder and the condensing-cylinder. In both high and low pressure engines there must be a continuous supply of new water. In this the steam is condensed into water again in the condensing-cylinder and in the hot-water tank and pumped from the tank into the boiler with only a small percentage of absolute loss. Even this is not entirely lost, because it is carried into the ash-pit and the fire-box and there used to fan the fires and mix with and burn up the gases from the coal, thereby making a great saving of fuel.

The working of the engine: $l$ is the rigid arm connecting the cross-head of the steam-cylinder with the piston of the condensing-cylinder, (marked $o$.) The piston of the condensing-cylinder works parallel and at the same time with that of the steam-cylinder. $c$ is the condensing-cylinder, into which the steam from the steam-cylinder passes through the exhaust-pipe $p$ and valves $r\ r$, and there mixes with the hot water introduced through pipes $u\ u$ and valves $v\ v$ from the tank $d$, wherein a great portion of the steam is condensed by means of the introduction of said water and its power nearly destroyed, and from said condensing-cylinder said water, mixed with the residue of steam, is forced by the piston $o$ through the valves $s\ s$ and pipe $t$ into tank $d$, two-thirds full of hot water. Then in tank $d$ nearly the whole of the residue of said steam is condensed and its power still further lost, and then the small portion of the uncondensed steam or vapor is passed through pipes $w\ w\ w$ into the ash-pit and fire-box, as shown in Fig. 4, and there increases the draft, and also the heat, by mixing with and aiding the burning up of the gases, thus aiding the economy of fuel. Connecting the tank with the boiler by an ordinary pump, (not shown on the drawings,) the boiler is supplied with hot water from the tank, thus making another economy of fuel.

What I claim as my invention, and desire to secure by Letters Patent, is—

The arrangement, in connection with a steam-engine, of an exhaust-cylinder the same as the motive cylinder substantially, and connected with the motive cylinder by two pipes with their valves, one at either end, and operated by a piston connected with the piston of the motive cylinder by a rigid arm, and also connected with a water-tank by two pipes with their valves, one at each end of the cylinder, the whole constructed and operated substantially as described.

Boston, October 5, 1865.

THOMAS C. ROBINSON.

Witnesses:
J. D. VAN DUZEE,
B. G. MOULTON.